US006987389B1

(12) United States Patent
Macbeth et al.

(10) Patent No.: US 6,987,389 B1
(45) Date of Patent: Jan. 17, 2006

(54) UPSTREAM/DOWNSTREAM ARC FAULT DISCRIMINATOR

(75) Inventors: Bruce F. Macbeth, Syracuse, NY (US); Tab Cox, Baldwinsville, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 375 days.

(21) Appl. No.: 09/992,055

(22) Filed: Nov. 14, 2001

Related U.S. Application Data

(60) Provisional application No. 60/248,296, filed on Nov. 14, 2000.

(51) Int. Cl.
  *H01H 9/50* (2006.01)
  *H02H 3/18* (2006.01)
(52) U.S. Cl. .................. 324/536; 361/78; 361/79
(58) Field of Classification Search ................ 324/521, 324/522, 536, 523–525, 500, 509, 527, 512; 361/78, 79, 42
See application file for complete search history.

(56) References Cited

U.S. PATENT DOCUMENTS

| | | | | |
|---|---|---|---|---|
| 3,986,115 A | * | 10/1976 | Huang ...................... 324/102 |
| 4,325,098 A | * | 4/1982 | Heller ........................ 361/82 |
| 4,351,011 A | * | 9/1982 | Liberman .................... 361/82 |
| 4,438,475 A | * | 3/1984 | Haley .......................... 361/82 |
| 4,539,520 A | * | 9/1985 | McBride ................. 324/117 H |
| 4,922,368 A | * | 5/1990 | Johns .......................... 361/62 |
| 5,432,455 A | * | 7/1995 | Blades ...................... 324/536 |
| 5,434,509 A | * | 7/1995 | Blades ...................... 324/536 |
| 5,572,138 A | * | 11/1996 | Nimmersjo ................. 324/522 |
| 5,659,453 A | * | 8/1997 | Russell et al. ............ 361/93.1 |
| 5,796,259 A | * | 8/1998 | Dickmander ............... 324/524 |

* cited by examiner

*Primary Examiner*—Anjan Deb
*Assistant Examiner*—John Teresinski
(74) *Attorney, Agent, or Firm*—Daniel P. Malley; Bond, Schoeneck & King PLLC

(57) ABSTRACT

An arc fault protection device protects a branch circuit portion of an electrical distribution system. The branch circuit is connected to a load. A first sensor detects fluctuations in load current, while a second sensor detects fluctuations in line voltage. The polarities of the fluctuations are compared, and the comparison indicates whether an arc signature, potentially indicative of an arc fault, is located in the branch circuit portion or located in a remainder of the electrical distribution system.

55 Claims, 12 Drawing Sheets

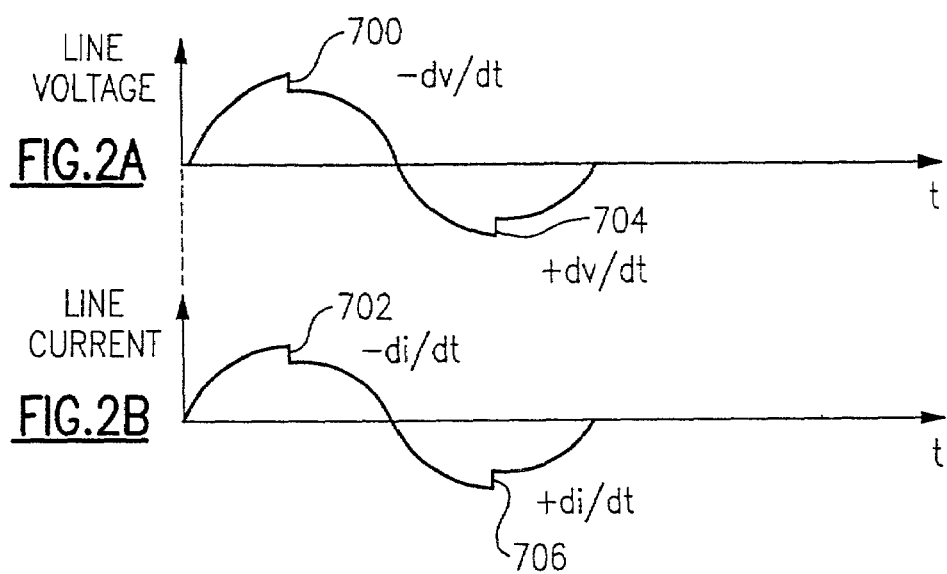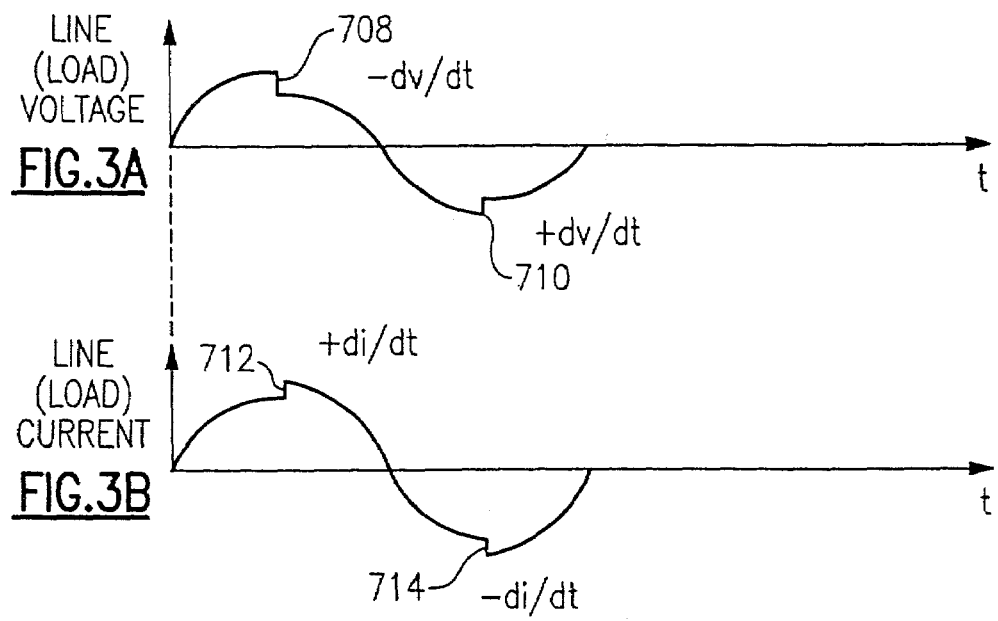

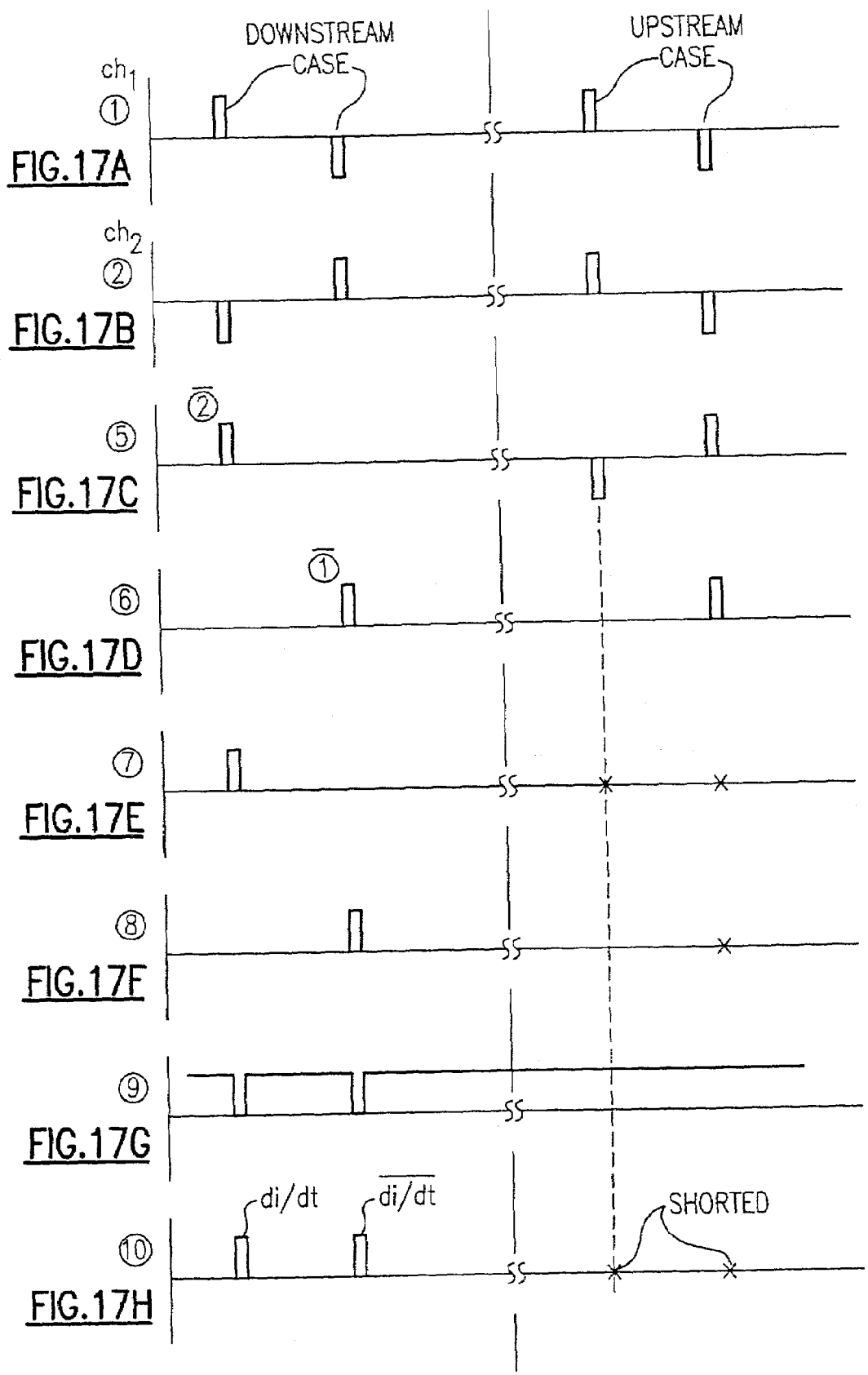

UPSTREAM/DOWNSTREAM ARC FAULT DISCRIMINATOR

CROSS-REFERENCE TO RELATED APPLICATIONS

This application claims priority from U.S. Provisional Application Ser. No. 60/248,296 filed Nov. 14, 2000 and entitled UPSTREAM/DOWNSTREAM DISCRIMINATION CIRCUIT FOR AFCI, incorporated herein by reference.

FIELD OF THE INVENTION

This invention relates generally to the field of arc fault detectors, and more particularly to an arc fault detector which discriminates between upstream and downstream arc faults.

BACKGROUND OF THE INVENTION

Underwriters Laboratories requirements for arc fault circuit interrupters (AFCI) require the AFCI to respond to certain arcing conditions on a branch circuit, i.e., a portion of an AC electrical distribution system, that the AFCI is intended to protect. When the AFCI detects an arc signature indicative of an arc fault, the AFCI interrupts the flow of electrical current on the protected branch circuit before the arcing condition causes flammable ignition of nearby combustibles. Arcing conditions may also occur elsewhere in the electrical distribution system, such as in the power utility or on other branch circuits, which the AFCI is not able to interrupt due to the location of the AFCI. Such arcing conditions produce the same arc fault signatures as those on the protected branch circuit and are sensed by the AFCI.

In order to meet Underwriters Laboratories requirements, the AFCI must not trip due to upstream arc mimicking noise or arcs associated with power utility arcing or alternate branch circuit arcing, but must respond to similar signals that are on the protected circuit. There is a need for an AFCI that discerns the location of the arc fault signals and responds only to those produced in the protected branch circuit.

"Downstream" refers to the branch circuit in which the AFCI is incorporated and that the AFCI is intended to protect. "Upstream" refers to the remainder of the electrical distribution system that the AFCI is unable to protect, for which tripping is considered nuisance tripping. Thus, upstream and downstream are always determined with reference to the location of the AFCI.

SUMMARY OF THE INVENTION

Briefly stated, an arc fault protection device protects a branch circuit portion of an electrical distribution system. The branch circuit is connected to a load. A first sensor detects fluctuations in load current, while a second sensor detects fluctuations in line voltage. The polarities of the fluctuations are compared, and the comparison indicates whether an arc signature, potentially indicative of an arc fault, is located in the branch circuit portion or located in a remainder of the electrical distribution system.

According to an embodiment of the invention, an arc fault detector for a power line system includes an upstream/downstream discriminator circuit, wherein the discriminator circuit detects when steps in a magnitude of a load current and steps in a magnitude of a line voltage are in phase for upstream transient events, and out of phase for downstream transient events.

According to an embodiment of the invention, an arc fault protection device, protective of a branch circuit portion of a power line electrical distribution system and connected to a load, includes a first sensor for detecting fluctuations in load current; a second sensor for detecting fluctuations in line voltage; and a discriminator for comparing the polarities of the fluctuations; wherein the comparison indicates whether an arc fault or arc mimicking noise is located in the branch circuit portion or located in a remainder of the electrical distribution system.

According to an embodiment of the invention, an arc fault protection device, protective of a branch circuit portion of an electrical distribution system and connected to a load, includes means for detecting fluctuations in load current; means for detecting fluctuations in line voltage; and means for comparing the polarities of the fluctuations; wherein the comparison is indicative of whether an arc fault signature indicative of a potential arc fault is located in the branch circuit portion or located in a remainder of the electrical distribution system.

According to an embodiment of the invention, a method for protecting a branch circuit portion of an electrical distribution system from an arc fault, the branch circuit portion being connected to a load, includes the steps of (a) detecting fluctuations in load current; (b) detecting fluctuations in line voltage; and (c) comparing the polarities of the fluctuations; wherein the step of comparing indicates whether an arc fault or arc mimicking noise is located in the branch circuit portion or located in a remainder of the electrical distribution system.

According to an embodiment of the invention, an arc fault protection device, protective of a branch circuit portion of an electrical distribution system and connected to a load, includes a high frequency portion which looks at instantaneous changes on a voltage wave and a current wave of the system, wherein a relationship between the instantaneous changes indicates whether a transient is upstream or downstream; and a low frequency portion which looks for a change in a fundamental frequency of the system and for changes in a plurality of harmonics of the fundamental frequency, wherein a sudden increase in the voltage wave accompanied by a sudden increase in the current wave indicates that the transient is upstream, and wherein a sudden increase in the voltage wave not accompanied by a sudden increase in the current wave indicates that the transient is downstream.

According to an embodiment of the invention, a method for protecting a branch circuit portion of an electrical distribution system from an arc fault, the branch circuit portion being connected to a load, includes the steps of (a) high frequency filtering a voltage wave and a current wave of the system; (b) determining whether a relationship exists between instantaneous changes on the high frequency filtered voltage wave and the high frequency filtered current wave of the system, and if so, whether the relationship indicates whether a transient is upstream or downstream; (c) low frequency filtering the voltage wave and the current wave of the system; and (d) determining whether a change in a fundamental frequency of the system and a change in a plurality of harmonics of the fundamental frequency occur, wherein a sudden increase in the low frequency filtered voltage wave accompanied by a sudden increase in the low frequency filtered current wave indicates that the transient is upstream, and wherein a sudden increase in the low frequency filtered voltage wave not accompanied by a sudden increase in the low frequency filtered current wave indicates that the transient is downstream.

According to an embodiment of the invention, an arc fault detector for a power line system includes an upstream/downstream discriminator circuit; wherein during intervals when a line voltage and a line current are of a same polarity, the discriminator circuit detects when steps in load current and steps in line voltage are in phase for upstream caused transient events, and out of phase for downstream caused transient events; and wherein during intervals when the line voltage and the line current are of opposite polarity, the discriminator circuit detects when steps in load current and steps in line voltage are out of phase for upstream caused transient events, and in phase for downstream caused transient events.

BRIEF DESCRIPTION OF THE DRAWINGS

FIG. 2A shows a waveform that shows the upstream transient waveform case.

FIG. 2B shows a waveform that shows the upstream transient waveform case.

FIG. 3A shows a waveform that shows the downstream transient waveform case.

FIG. 3B shows a waveform that shows the downstream transient waveform case.

FIG. 17A shows a waveform associated with the embodiment of FIG. 16.

FIG. 17B shows a waveform associated with the embodiment of FIG. 16.

FIG. 17C shows a waveform associated with the embodiment of FIG. 16.

FIG. 17D shows a waveform associated with the embodiment of FIG. 16.

FIG. 17E shows a waveform associated with the embodiment of FIG. 16.

FIG. 17F shows a waveform associated with the embodiment of FIG. 16.

FIG. 17G shows a waveform associated with the embodiment of FIG. 16.

FIG. 17H shows a waveform associated with the embodiment of FIG. 16.

DETAILED DESCRIPTION OF THE PREFERRED EMBODIMENT

Arc fault currents start at a random phase angle after the zero cross of the power line frequency and stop at a random phase angle prior to the next zero crossing of the power line frequency. The arc signature is based on the start and stop edges and the di/dt signal that they produce. The start and stop edges of the arc fault current influence the supply voltage, thereby producing a dv/dt signal. Conversely, there can be dv/dt edges in the line voltage caused by events in the unprotected portion of the power distribution system, thereby producing di/dt signal in the protected branch circuit. Taking this into consideration, the polarity relationship between the leading edges in particular of the di/dt and dv/dt signals allows discrimination in the origin of the arc fault or arc mimicking noise, that is, to determine whether the event originated on the unprotected or protected portions of the electrical distribution system, so that the AFCI is able to respond only to those events occurring on the protected branch circuit.

In one embodiment, start di/dt signal is ignored, and the AFCI detects solely the stop di/dt edges, i.e., those moments when the arc current extinguishes during one or more half cycle of the power line frequency. The advantage of ignoring start di/dt is that start di/dt is commonly arc-mimicking noise produced by appliances such as dimmers or variable speed electrical drills having phase control thyristors. Ignoring start di/dt improves noise immunity of the AFCI to false tripping. However, by the nature of the arc fault, the stop di/dt signal strength is weaker than the start di/dt signal strength, thereby requiring the sensitivity of the detector to be increased, increasing the number of detected di/dt events and the significance of being able to locate their origin.

Figure 1:
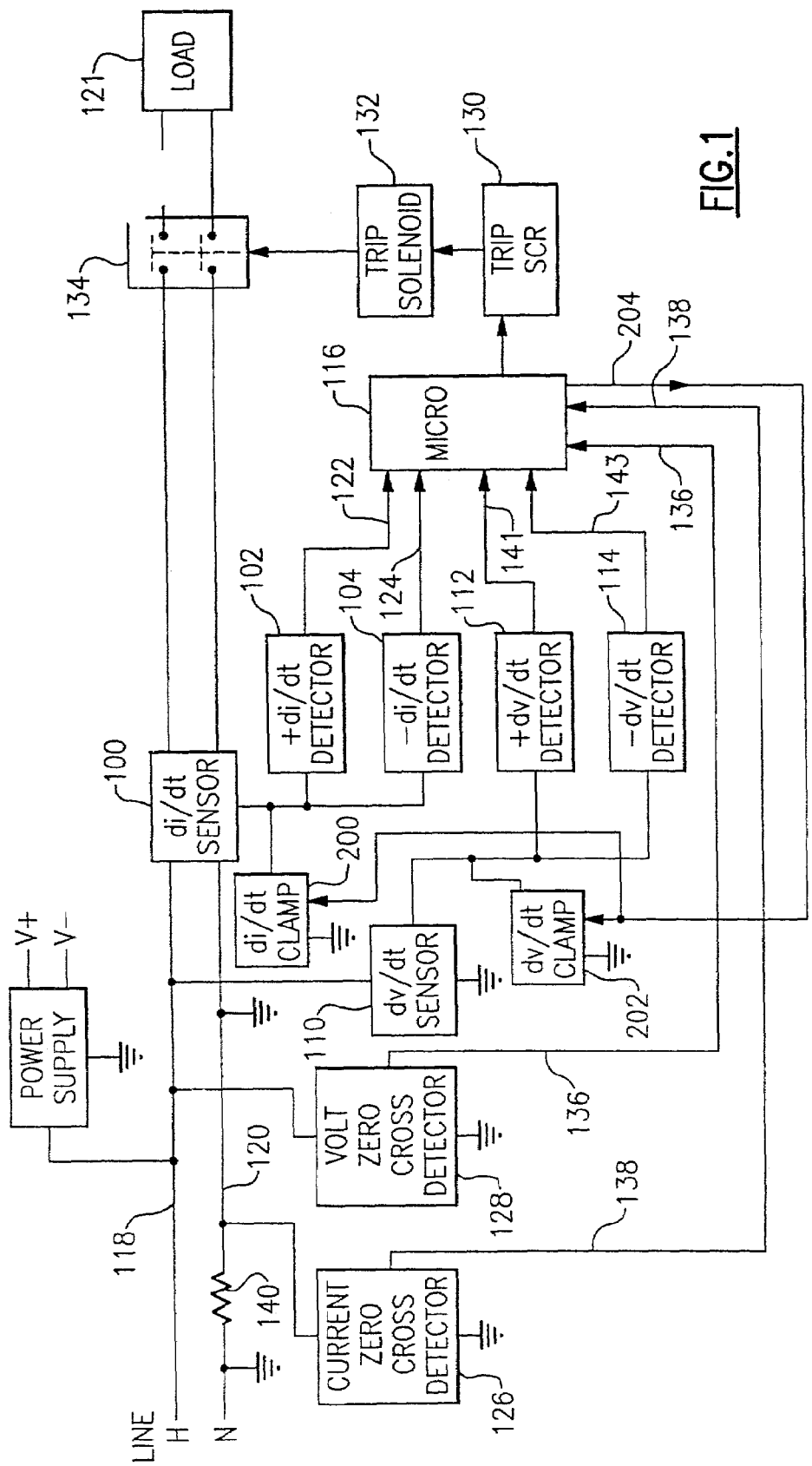
FIG. 1 shows a block diagram of a first embodiment of the upstream/downstream arc fault di/dt discriminator according to the present invention.

Referring to FIG. 1, a block diagram of a first embodiment of the upstream/downstream arc fault di/dt discriminator is shown. A di/dt sensor 100 detects the positive or negative (+/−) di/dt of the line current occurring in a hot conductor 118 and a neutral conductor 120. The sensed +/−di/dt signal acts as input to a +di/dt detector 102 and the sensed −di/dt signal acts as input to a −di/dt detector 104. A dv/dt sensor 110 responds to the +/−dv/dt occurring in the line voltage. The sensed +/−dv/dt signal acts as input to a +dv/dt detector 112 and a −dv/dt detector 114. The detection sensors for acquiring the di/dt and dv/dt may have recovery time which results in ringing, which can cause false detection of arc fault di/dt or dv/dt with the direction of origin lost. The ringing caused by sensor 100 can be dampened with resistance and peak transient clamps to a large degree, but large transients in the line can still cause enough sensor output ringing to cause false detection. Therefore a method is required for rejecting the ringing.

The outputs of +/−di/dt detectors 102 and 104 and +/−dv/dt detectors 112 and 114 are fed directly into a microprocessor 116 as inputs 122, 124, 141, and 143 respectively. Microprocessor 116 also has a voltage zero cross signal input 136, sensed from the line hot 118 by a voltage zero cross detector 128, and likewise microprocessor 116 has a current zero cross input 138, derived by detection of the voltage across current viewing a resistor 140 by a current zero cross detector 126. The voltage zero cross at microprocessor input 136 allows microprocessor 116 to accurately locate the di/dt in the voltage half wave for determination of arc start di/dt, because the di/dt occurs in the first 90 degrees of the voltage half wave, or to locate the arc extinguish, or cessation, di/dt which occurs in the last 90 degrees of the voltage half wave, and just before the voltage zero cross in non-phase shifted arc currents flowing through hot conductor 118 or neutral conductor 120.

The arc fault cessation di/dt is the preferred method of arc fault detection as the cessation di/dt is unique to arcing and allows discrimination from light dimmer di/dt, which, when near the end of the half cycle for low dimmer settings, is of the opposite, current step up, di/dt polarity as the arc fault cessation di/dt, which is of the current step down di/dt polarity. If microprocessor 116 detects di/dt and dv/dt pulses whose polarity relationship is indicative of a downstream event, and whose pattern indicates that the downstream event is an arc fault as opposed to arc-mimicking noise, microprocessor 116 sends a signal to activate a switch such as an SCR 130. Activating SCR 30 enables trip solenoid 132 to open interrupting contacts 134, thereby interrupting arc fault currents associated with hot conductor 118 and neutral conductor 120 of the protected branch circuit.

Referring to FIGS. 2A–2B, the upstream-caused transient event waveform case is shown. FIG. 2A shows a line voltage waveform, while FIG. 2B shows a line current waveform. When a step in line voltage occurs, such as −dv/dt step 700, the step causes a −di/dt step 702 in the line current. Likewise, a +dv/dt step 704 causes +di/dt step 706; therefore, upstream transient steps in line voltage cause in-phase transient steps in line current, and the transients in line current are driven by the change in line voltage.

Referring to FIGS. 3A–3B, the downstream-caused transient event waveform case is shown. FIG. 3A shows a load voltage waveform, while FIG. 3B shows a load current waveform. The downstream-caused transients occur from steps in load current. A +di/dt step 712 causes a −dv/dt step 708 in the line voltage because of the voltage drop across the inherent upstream line impedance which includes the resistance and inductance of the feed wires and also the low frequency core of the power transformer, because the low frequency transformer core, when subjected to fast transient events, cannot supply the instantaneous transient. Likewise, a −di/dt 714 event causes a +dv/dt event 710; therefore, for downstream-caused load current transients steps, the steps in load current are of the opposite phase as the steps in line voltage. The same phase relationship occurs for the low frequency changes in line current and line voltage in that low frequency changes in the upstream line voltage cause in-phase low frequency changes in line current and step changes in downstream load current cause opposite phase step changes in the low frequency line voltage against the inherent upstream impedance.

Figure 4A:
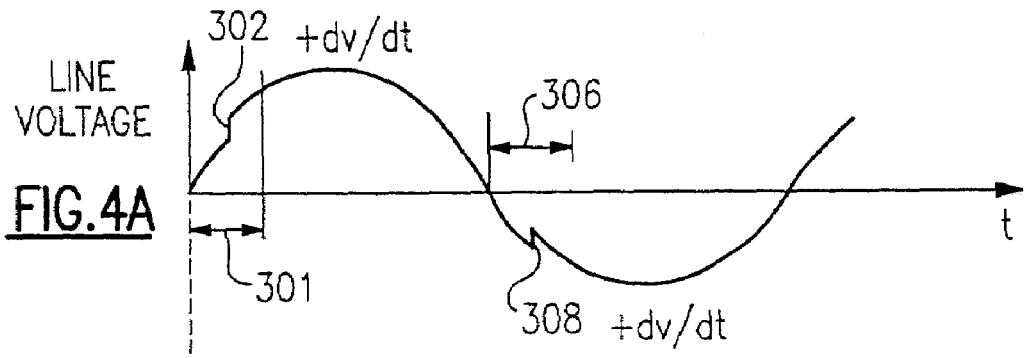
FIG. 4A shows a waveform that shows the phase-shifted upstream transient waveform case.
Figure 4B:
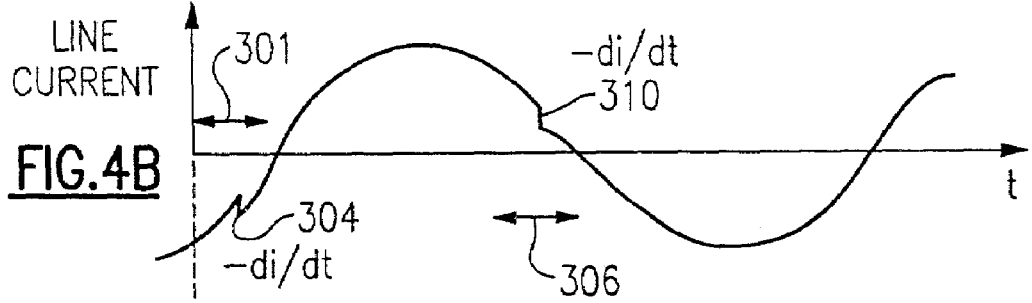
FIG. 4B shows a waveform that shows the phase-shifted upstream transient waveform case.

Referring to FIGS. 4A–4B, FIG. 4A shows the line voltage waveform and FIG. 4B shows the line current waveform for the upstream-caused transient event waveform case where the current is phase-shifted due to an inductive load 121 with arcing in hot conductor 118 or neutral conductor 120. Referring back to FIG. 1, the current zero cross signal at microprocessor 116 input 138, which zero cross is affected by arcing, is used to detect the phase shift and specifically the intervals in the half wave when the line voltage is of opposite polarity to the line current. In FIGS. 4A–4B, an interval 301 is the phase shifted interval when the line voltage is of opposite polarity to the line current. When an upstream step up transient event causes +dv/dt 302 during interval 301, the shift causes the load current to increase proportionally, which causes a −di/dt transient step 304. Similarly, during an interval 306 when the line voltage is negative and the line current positive, a voltage step down +dv/dt 308 causes a current step down −di/dt 310.

Figure 4C:
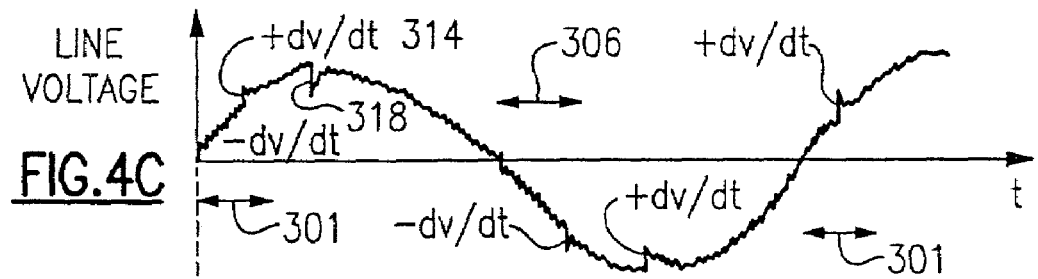
FIG. 4C shows a waveform that shows the phase-shifted downstream transient waveform case.
Figure 4D:
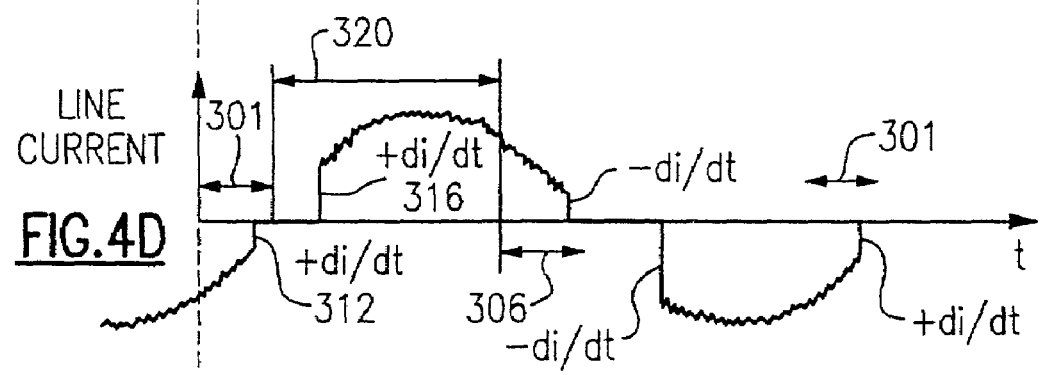
FIG. 4D shows a waveform that shows the phase-shifted downstream transient waveform case.

Referring to FIGS. 4C–4D, FIG. 4C shows the line voltage waveform and FIG. 4D shows the line current waveform for the phase shifted case for downstream transient events and shows a downstream inductive load 121 which is experiencing arcing in the protected hot conductor 118 and neutral conductor 120. During interval 301, when the line voltage is positive and the line current negative, an arc cessation transient +di/dt 312 occurs just before the current zero cross. The arc cessation causes +dv/dt 314 as the line recovers from the voltage drop across the inherent upstream line impedance caused by the load current. The arc current start causes a step-up transient +di/dt 316, which causes the line voltage to step down against the inherent upstream impedance causing −dv/dt 318, but since the line voltage and line current are positive during interval 320, the di/dt is again out of phase with dv/dt for downstream transients.

It also can be seen by referring to FIGS. 2A–2B, 3A–3B, and 4A–4D that regardless of phase shift, the change in magnitude of the instantaneous line voltage is in phase with the change in magnitude of the instantaneous line current when each is caused by an upstream transient, and the change in magnitudes are out of phase when each is caused by a downstream transient. These types of transient events produce a high frequency spectrum.

Referring back to FIG. 1, the signal from current zero cross detector 126 also allows the microprocessor 116 to locate the region in the half wave where arc cessation di/dt should have occurred, namely just before the current cessation zero cross when an arcing load is in the presence of non-arcing loads, or at the current cessation zero cross when the arcing load is the only load.

Microprocessor 116 is preferably programmed to implement the following method. A predetermined quiet period is determined by the absence of any detected +/−di/dt or +/−dv/dt on microprocessor 116 inputs 122, 124, 141, or 143, respectively. The quiet period is used to prevent microprocessor 116 from responding to sensed error di/dt and dv/dt caused by sensor ringing. If a period greater than the quiet period is detected, any detection of the +/−di/dt or +/−dv/dt causes microprocessor 116 to poll and store the state of the other of the inputs for near concurrence in a predetermined polling interval. Following the poll, microprocessor 116 returns and waits for the predetermined quiet period. If a +/−di/dt occurs with a near concurrence of a −/+dv/dt during the predetermined interval of polling, and if the poll occurs during an interval when the line voltage and line current are of the same polarity, then the microprocessor 116 stores the event as a downstream detected +di/dt or −di/dt event. Otherwise, the event is rejected as a +/−di/dt event caused by a +/−dv/dt upstream event. If, after the poll, the +/−di/dt occurs in near concurrence with +/−dv/dt during the predetermined interval of polling and during the interval when the line voltage is the opposite polarity of the phase shifted line, then microprocessor 116 stores the event as a downstream detected +di/dt or −di/dt. The microprocessor is optionally programmed to look for a particular polarity di/dt or dv/dt occurring in near concurrence to the other in a particular quadrant of the sine wave, such as the last 90 degrees of the positive half wave without phase shift, where a −di/dt arc cessation pulse should be accompanied by a +dv/dt pulse.

As a check, on a +/−di/dt detector 102 or 104 output event, if neither a +/−dv/dt detector 112 or 114 output event is detected by microprocessor 116, then microprocessor 116 can determine that the line voltage is stiff and therefore a +/−di/dt of the line current cannot pull a +/−dv/dt in the line voltage. Microprocessor 116 can also determine that a +/−dv/dt upstream transient event is not causing the +/−di/dt current event. Determination of a stiff line using this technique allows microprocessor 116 to bypass the +/−di/dt in near concurrence with −/+dv/dt requirement and process the arriving +/−di/dt in the arc fault detection algorithm directly. This technique optionally allows microprocessor 116 to activate a secondary low frequency detection method such as variations in load current amplitude, load current area, or the interval of load current for arc fault identification.

In practice, a stiff line in which fast rising arc fault di/dt cannot pull line voltage dv/dt is unusual because the upstream source connected to the AFCI, which includes the line transformer, has enough inductance and transformer core drop out to cause dv/dt when a downstream di/dt occurs from either a step in load current from normal load switching or from an arc fault.

A problem can occur with the above method if enough transient events are occurring from an arc fault so as to never satisfy the quiet period requirement. If this occurs, microprocessor 116 can never respond to the arc fault. The quiet period requirement is used to prevent microprocessor 116 from responding to sensed error di/dt and dv/dt caused by sensor ringing. If the sensors are prevented from ringing and only respond in a linear way to the actual line transient events, then the quiet period requirement is not necessary.

Figure 5:
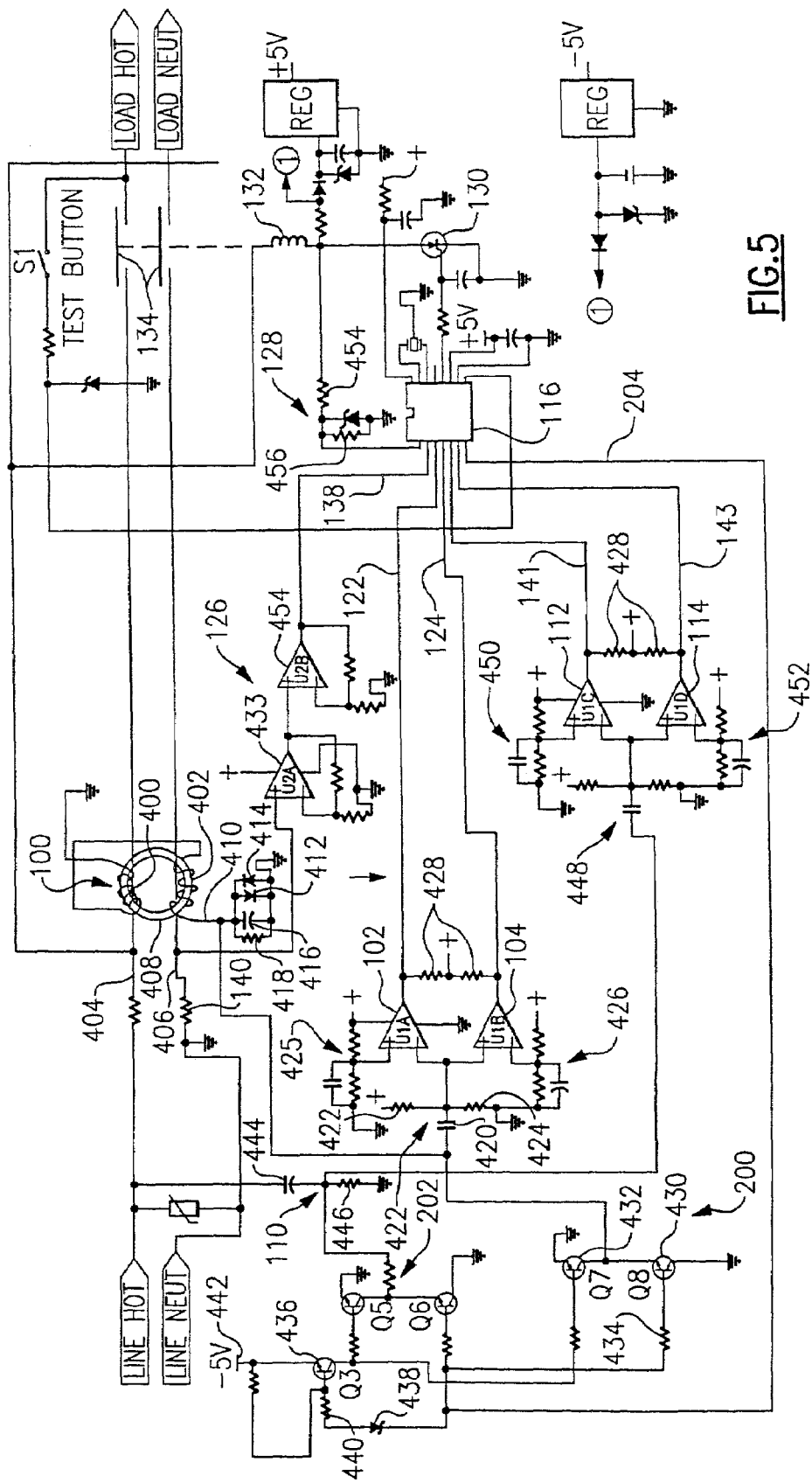
FIG. 5 shows a schematic realization of the embodiment of FIG. 1.

Referring to FIG. 5, a schematic of the block diagram shown in FIG. 1 is shown with like elements bearing like numbers. A di/dt clamp 200 and a dv/dt clamp 202 are activated by microprocessor 116 output 204. Sensors 100 and 110 are held clamped by clamps 200 and 202, respectively, which are enabled by microprocessor 116 output 204, so that each sensor can not respond to any transient line event until clamps 200 and 202 are released by microprocessor 116. After the release, any detected +/−di/dt or +/−dv/dt on microprocessor 116 inputs 122, 124, 141, or 143, respectively causes microprocessor 116 to poll and store the state of the other of the inputs for near concurrence in the predetermined polling interval as described above for determination of downstream caused di/dt. After the predetermined polling interval, microprocessor 116 immediately re-applies clamps 200 and 202 for a predetermined interval to clamp sensor 100 and 110 ringing, after which interval microprocessor 116 releases the clamps and starts the process over again in a constant cycle. In this way, microprocessor 116 releases the clamps during an interval of arc fault signature search, preferably just before a current zero cross in which interval an arc fault cessation di/dt may occur, and determines if the di/dt is from upstream or downstream. This approach also allows the line to be polled for di/dt and dv/dt in the presence of active transients. When an arc fault detection algorithm, which is preferably programmed in microprocessor 116 but can be implemented in hardware or firmware, determines that the downstream detected di/dt is from an arc fault using a preferred method of identifying arc cessation di/dt, microprocessor 116 issues a trip command and activates SCR 130, solenoid 132, and interrupting contact mechanism 134.

Di/dt sensor 100 includes a two winding current transformer with a first winding 400 wound on a transformer core 408 adjacent to a hot wire 404 and receiving more of the hot wire 404 flux than the neutral wire 406 flux, and a second winding 402 wound on the core 408 adjacent to the neutral wire 406 and receiving more of the neutral wire 406 flux than the hot wire 404 flux. Both windings are connected for series adding in common mode operation and series opposing for differential mode operation so as to respond to common mode arc fault di/dt and reject differential mode di/dt, which differential mode di/dt causes a field flux which engages the entire core 408, and which field flux produces a large sensor 100 output for small differential di/dt currents such as occur through filter capacitors to ground. The output of di/dt sensor 100 winding 402 lead 410 is applied to one side of the parallel combination of a ring damping resistor 418, a filter cap 416, a positive clamp 412, and a negative clamp 414. Positive and negative clamps 412, 414 limit the response to large di/dt occurring in wires 404 and 406, with the other side of the parallel combination connected to circuit common. The other output lead from di/dt sensor 100 winding 400 is connecting to circuit common. Di/dt sensor 100 output 410 also connects to an offset and high pass filter 422 composed of a capacitor 420 and two resistors 422 and 424 to block 60 Hz signal and to provide DC offset, thus allowing +di/dt detector comparator 102 and −di/dt detector comparator 104 to operate from a single ended supply and low-going output suitable for microprocessor 116. An offset circuit 425 sets the +di/dt threshold for +di/dt detector 102 and an offset circuit 426 sets the −di/dt threshold for −di/dt comparator 104. Resistors 428 and 430 bias the open collector outputs of +di/dt and −di/dt detectors 102 and 104 respectively.

Di/dt sensor 100 output 410 also connects to clamp 200 composed of a positive clamp NPN transistor 432 and a negative clamp transistor PNP 432. Both transistors 430 and 432 are activated by a signal from microprocessor 116 output 204. Output 204 acts directly on transistor 430 via base resistor 434 causing the collector of transistor 430 to sink +di/dt sensor 100 output 410 to circuit common for positive di/dt. The collector of PNP transistor 432 sinks the −di/dt sensor 100 output 410 to circuit common when microprocessor 116 output 204 causes a Zener diode 438 to conduct, causing the collector of NPN transistor 436 to connect the base of transistor 432 to a negative source 442.

The output of +di/dt detector 102 connects to microprocessor 116 input 122 and −di/dt detector 104 connects to microprocessor 116 input 124. Dv/dt sensor 110 is a high pass filter composed of a capacitor 444 and a resistor 446. The output of dv/dt sensor 110 is taken across resistor 446 and is connected to a high pass and offset circuit 448 which drives +dv/dt detector comparator 112, referenced to DC offset circuit 450, and −dv/dt detector comparator 114 referenced to a DC offset circuit 452. +Dv/dt detector 112 drives microprocessor 116 input 141 while −dv/dt detector 114 drives microprocessor 116 input 143. The output of dv/dt sensor 110 taken across resistor 446 is clamped by clamp circuit 202 which acts at the same time and in the same manner as clamp 200. Current zero cross detector 126, composed of two amplifiers 453 and 454, amplify the voltage across current view resistor 140 in series with wire 406, providing current zero cross information to microprocessor 116 input 138. Voltage zero cross detector 128, composed of voltage divider resistors 454 and 456, provides voltage zero cross information to microprocessor 116 input 136.

Figure 6:
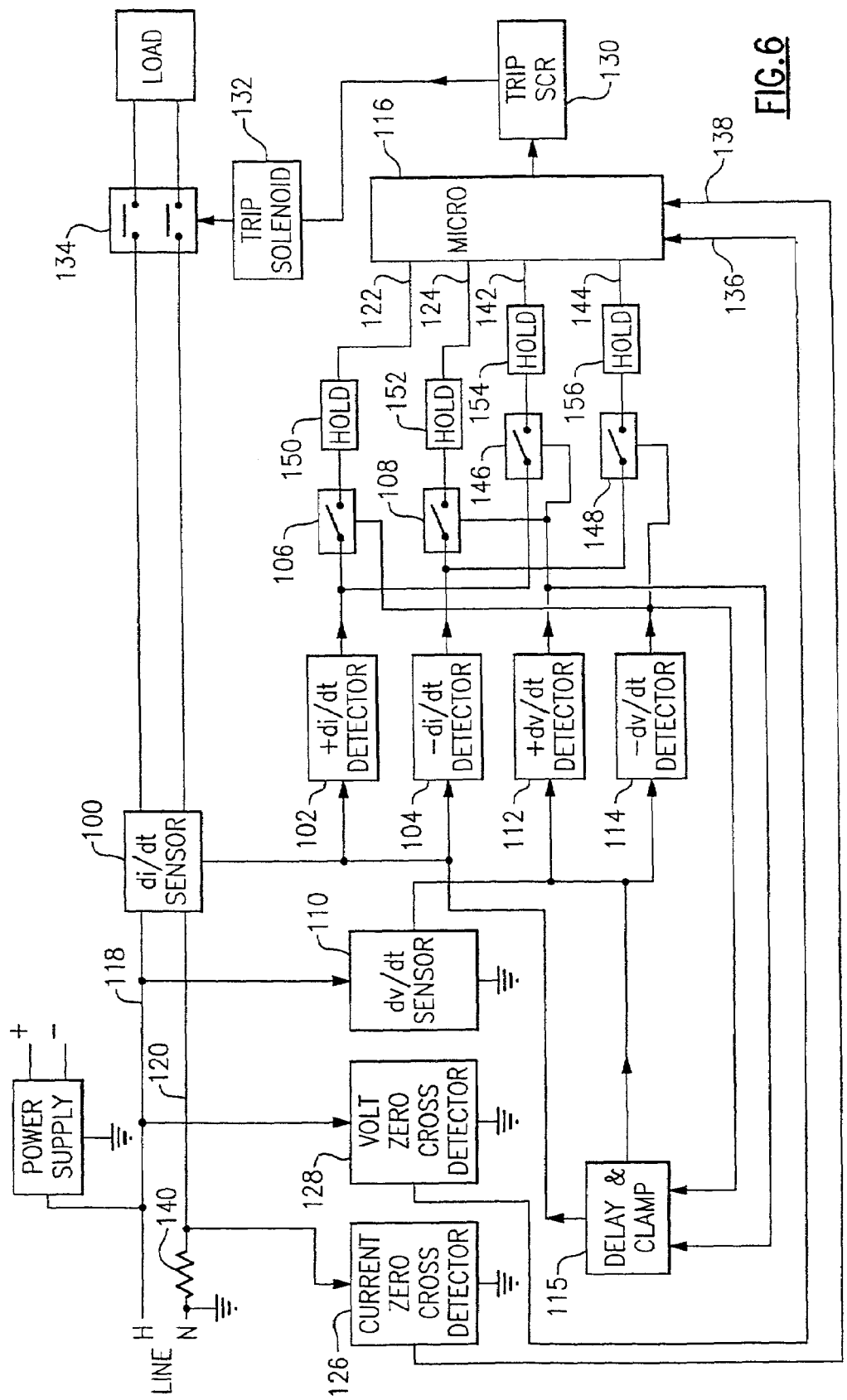
FIG. 6 shows a block diagram of a second embodiment of the upstream/downstream arc fault di/dt discriminator according to the present invention.

Referring to FIG. 6, a block diagram of a second embodiment of the upstream/downstream arc fault di/dt discriminator is shown with like elements to FIG. 1 bearing like numbers. Di/dt sensor 100 detects the +/−di/dt of the line current occurring in hot conductor 118 and neutral conductor 120. The sensed +/−di/dt signal acts as input to +di/dt detector 102 and −di/dt detector 104. Dv/dt sensor 110 responds to +/−dv/dt occurring in the line voltage. The sensed +/−dv/dt signals act as inputs to +dv/dt detector 112 and −dv/dt detector 114. Switch 106 controls whether microprocessor 116 intercepts the output from +di/dt detector 102. Switch 106 is activated by −dv/dt detector 114, so that when +di/dt occurs at the same time as −dv/dt, indicating a downstream caused +di/dt event, switch 106 closes and is the only way to allow the output signal of +di/dt detector 102 to pass to microprocessor 116 input 122 for detection.

Likewise, the output of −di/dt detector 108 is prevented from reaching microprocessor 116 input 124 unless switch 108 is activated by the output of +dv/dt detector 112. In this way, only downstream-caused di/dt can reach detector microprocessor 116. The outputs of both +dv/dt detector 112 and −dv/dt detector 114 also connect to a delay and clamp circuit 115, the delay part of which allows the leading edge of either the output of +di/dt detector 102 or −di/dt detector 104 to pass through switches 106, 108, 146, and 148, depending on gating from dv/dt detectors 112 and 114. The clamp part of delay and clamp circuit 115 clamps di/dt sensor 100 and dv/dt sensor 110 to keep them from producing further signal during a predetermined clamp period, thus preventing signals from +/−di/dt detectors 102, 104 and +/−dv/dt detectors 112, 114. This clamp period rejects any follow up ringing signal from either di/dt sensor 100 or dv/dt sensor 110. In this way, the line is forced to settle before the clamp part of delay and clamp circuit 115 allows di/dt detectors 102 and 104 to pass detected output signals. This gated switch upstream/downstream di/dt discrimination also allows the outputs of switches 106, 108, 146, and 148 to be stored for a predetermined interval in holding circuits 150, 152, 154, and 156, respectively, so that an arc fault detector need not work at the speed required to acquire the fast acting di/dt, but still enabling the AFCI to maintain good upstream/downstream di/dt discrimination.

Microprocessor 116 also has a voltage zero cross signal input 136, sensed from hot conductor 118 by voltage zero cross detector 128, as well as a current zero cross input 138, derived by detection of the voltage across a current viewing resistor 140 in series with either neutral conductor 120 or hot conductor 118 by current zero cross detector 126. The voltage zero cross at microprocessor input 136 allows microprocessor 116 to accurately locate the di/dt in the voltage half wave for determining the arc start di/dt, which occurs in the first 90 degrees of the voltage half wave, or to locate the arc cessation di/dt which occurs in the last 90 degrees of the voltage half wave and just before the voltage zero cross in non-phase shifted arc currents. The arc fault cessation di/dt is the preferred method of arc fault detection as the cessation di/dt is unique to arcing and allows discrimination from light dimmer di/dt which, when near the end of the half cycle for low dimmer settings, is of the opposite start di/dt polarity to the stop di/dt polarity of the arc fault cessation di/dt. The current zero cross signal at microprocessor 116 input 138, which is affected by arcing, is used to detect phase shift and specifically the intervals in the half wave when line voltage is of opposite polarity to the line current. During these intervals, downstream-caused di/dt is in phase with line dv/dt so that microprocessor 116 polls inputs 142 and 144 instead of inputs 122 and 124. Inputs 142 and 144 are connected to switches 146 and 148 respectively, with switch 146 passing +di/dt detector 102 output to microprocessor 116 input 142 when +dv/dt detector 112 output enables switch 146, and with switch 148 passing −di/dt detector 104 output to microprocessor 116 input 144 when −dv/dt detector 114 output enables switch 148. In this way, the upstream/downstream di/dt discrimination method is unaffected by phase shift.

Not shown for simplicity in FIG. 6 are the transistors which implement the functions of switches 146 and 148, and the one shot timers which implement the hold functions of holding circuits 154 and 156, which functions are used for detecting di/dt when the line voltage is of opposite polarity to line current during as caused by phase shifting loads.

Figure 7:
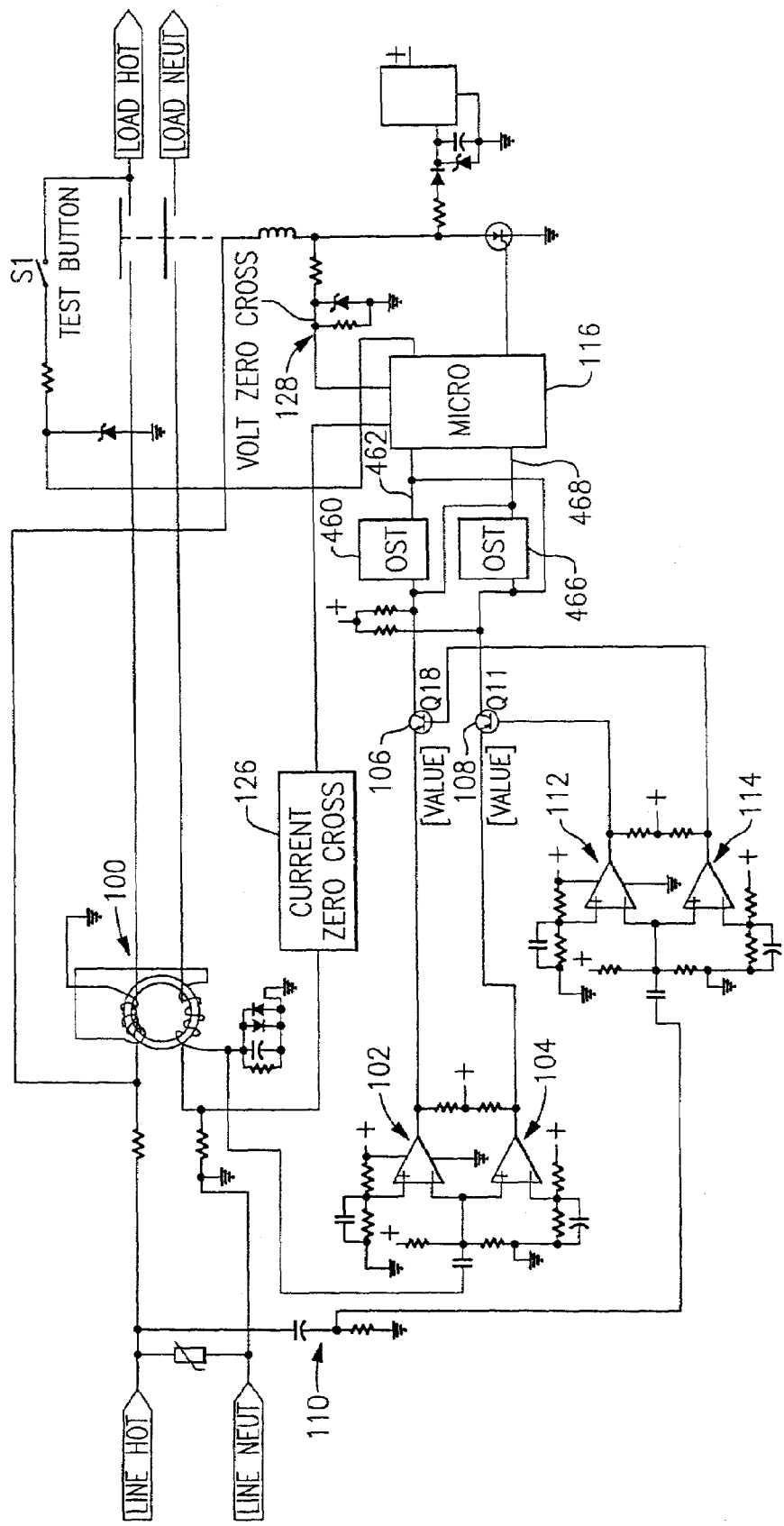
FIG. 7 shows a schematic realization of the embodiment of FIG. 6.

Referring to FIG. 7, one circuit implementing the block diagram of FIG. 6 is shown, with like elements between FIGS. 1, 5, and 6 labeled the same. As described with respect to FIG. 6, di/dt sensor 100 outputs +/−di/dt signals to +di/dt detector 102 and −di/dt detector 104, while dv/dt sensor 110 outputs +/−dv/dt signals to +dv/dt detector 112 and −dv/dt detector 114. Detectors 102, 104 have open collector active low outputs. Detectors 112 and 114 have open collector, active high, outputs. The emitter of switch NPN transistor 106 is connected to the output of +di/dt detector 102 and the base of transistor 106 is connected to the output of −dv/dt detector 114 so that when both detectors 102 and 114 are active, the transistor pulls the normally high collector of transistor 106 low. The low going collector triggers a one shot timer 460, causing a high output 462, for a time interval which is longer than the ringing interval of di/dt sensor 100 and dv/dt sensor 110. One shot timer 460 serves several purposes: (1) the timer triggers on the first transient signal leading edge outputs from detectors 102 and 114, which, when each are in coincidence, indicates a downstream detected +di/dt, (2) the time out of one shot timer 460 is long enough to let ringing die down in both the di/dt sensor 100 and dv/dt sensor 110 before timer 460 can time out, (3) the output of timer 460 stays high long enough for a slow reading arc fault detector microprocessor 116 operating at a slow clock speed or with a slow algorithm to respond to the downstream detected +di/dt, (4) if di/dt sensor 100 and dv/dt sensor 110 have ringing following detection of a transient, then timer 460 is constantly re-triggered which acts to hold the timer output constantly high until the ringing ends and the timer times out, and (5) the high output of timer 460 holds the input of one shot timer 466 high and inactive so that any detection of downstream +di/dt cannot occur at the same time as detection of downstream −di/dt by arc fault detector microprocessor 116. The −di/dt detector 104 and −dv/dt detector 114 output act in the same way as described above but acting on switch transistor 108, with switch transistor 108 acting on one shot timer 466, and one shot timer 466 output acting on microprocessor 116 input 468 and also acting to clamp the input of one shot timer 460.

Figure 8:
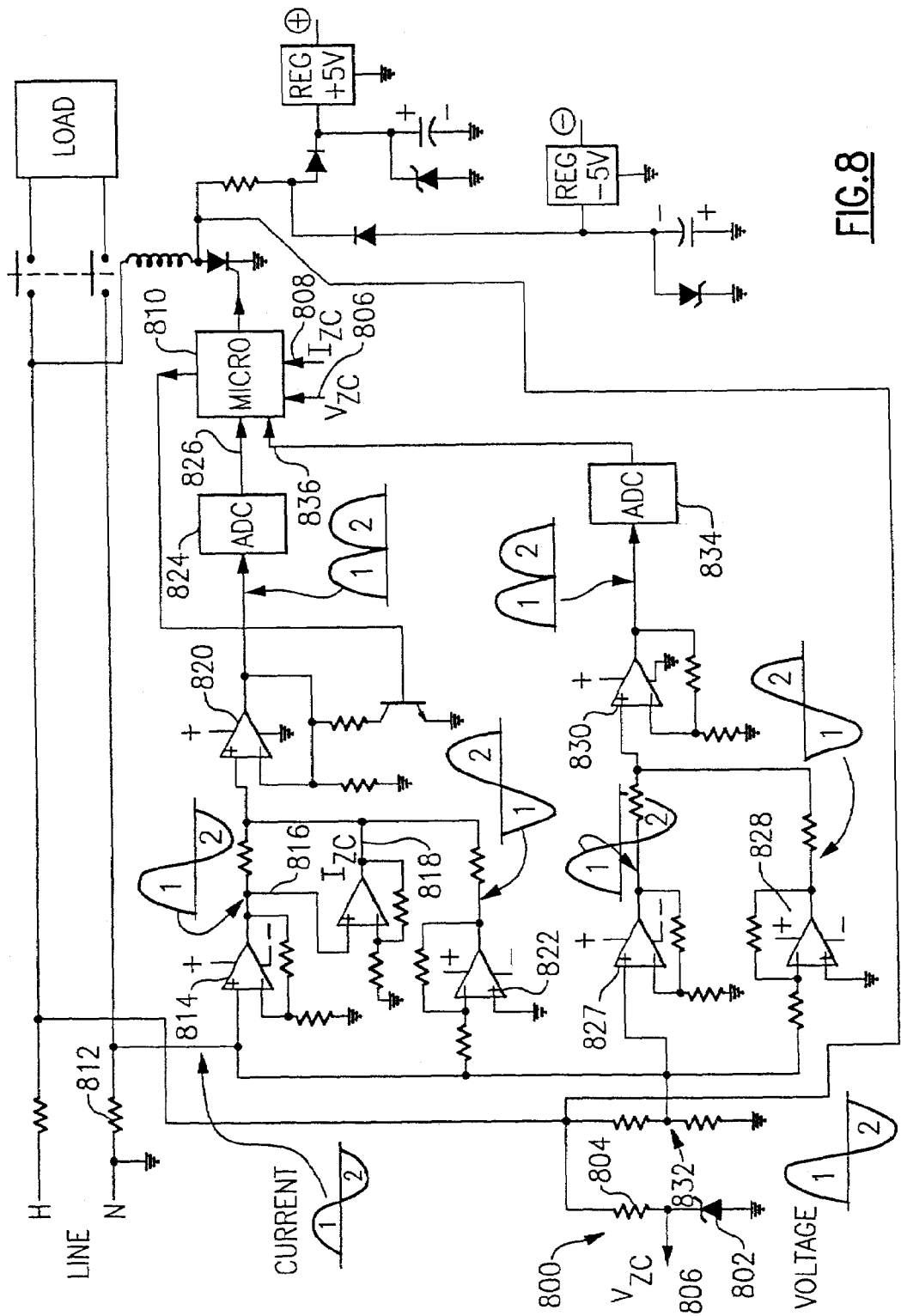
FIG. 8 shows a circuit of an upstream/downstream low frequency arc fault discriminator.

Referring to FIG. 8, a circuit which determines if low frequency current transient variations are from upstream or downstream is shown. These variations may be from downstream arc faults. The embodiments described above all deal with detecting transient di/dt and dv/dt occurring in the line voltage and line current to support an arc fault detector detecting the di/dt of an arc fault. The technique described below is an upstream/downstream discriminator technique which supports a low frequency arc fault detection method at frequencies near the fundamental 60 Hz for U.S. power systems or the fundamental 50 Hz for European power systems. Such arc detection techniques look for variation in the amplitude of the current wave, variation in the area of the current wave –or variation of the interval of the current wave. All of these techniques prevent the AFCI from responding to current variations caused by upstream line voltage variations. The technique described below uses the same principle as described above wherein variations in line current are in phase with variations in line voltage for upstream-caused events and out of phase for downstream events when a step increase in load current or arc current cause a step down in line voltage against the inherent upstream line impedance.

A voltage zero cross detector circuit 800 is connected across the line which creates a pulse proportional to the line voltage half wave across a Zener clamp 802 against a limit resistor 804. The output of voltage zero cross detector 800 is connected as an input 806 to a microprocessor 810. A sample of the line current waveform is taken as a voltage across a current view resistor 812, which is amplified by non-inverting amplifiers 814 and 816 to produce an output current zero cross signal at microprocessor 810 input 818. The output of non-inverting amplifier 814, which is a sine wave, is input to a single ended supplied summer amp 820 which strips the positive portion of the current half wave from the output of non-inverting amplifier 814. At the same time, an inverting amp 822 takes the signal across current view resistor 812 and amplifies and inverts the signal. The inverted signal is fed into the other input of summer 820 which strips off the negative going portion of the signal from the output of inverting amplifier 822 leaving the positive signal portion which is proportional to the negative half cycle of the current wave. In this way, the output of summer amp 820 has a rectified version of the current wave.

The rectified output of summer amplifier 820 is fed into an ADC 824 which converts the signal to digital form for acceptance at microprocessor 810 input 826. Microprocessor 810 accumulates and sums the stream of ADC 824 digital output during each current half wave as determined by current zero cross input 818 and produces a memory of the area of each current half wave. At the same time, non-inverting amplifier 827, non-inverting summer 830, and inverting amp 828 perform the same function as non-inverting amplifier 814, non-inverting summer 820, and inverting amplifier 822, respectively, but produce a rectified signal of the line voltage taken across the voltage divider 832 connected across the line. The rectified signal at the output of non-inverting summer 830 is converted by an ADC 834 into digital form for input to microprocessor 810 input 836 in the same way as the ADC 824 provided signal to microprocessor 810 input 826.

Microprocessor 810 also accumulates and sums the stream of ADC 834 output during each voltage half wave as determined by voltage zero cross input 806 and produces a memory of the area of each voltage half wave. At the end of every current half wave or voltage half wave, as determined by current zero cross input 818 or voltage zero cross input 806 respectively, the stored area proportional to the present current half wave is compared to the stored area of the last current half wave and a +/–delta change is measured and recorded by microprocessor 810. At the same time, the stored area proportional to the present voltage half wave is compared to the stored area of the last voltage half wave and a +/–delta change is measured and recorded by microprocessor 810. If the delta change in the current half wave is proportional to the delta change in the voltage half wave, then microprocessor 810 ignores the current area delta change as being upstream caused. If a delta change in the current half wave is opposite to the delta change in the voltage half wave, then microprocessor 810 accepts the current area delta change as being downstream caused and possibly containing an arc fault signature. This technique also detects low frequency changes in the magnitudes of the line current area and line voltage area and in which the transient events produce a low frequency spectrum.

Figure 9:
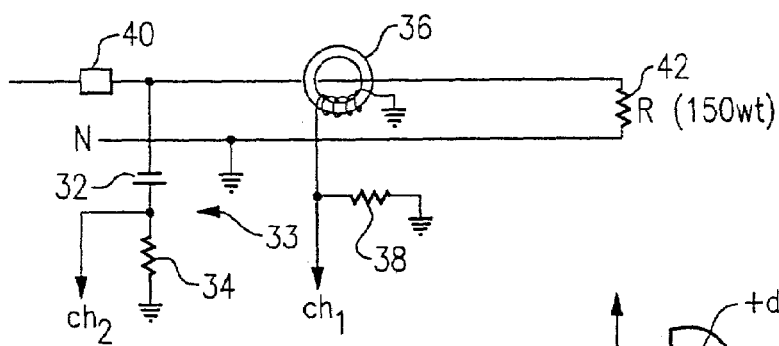
FIG. 9 shows a portion of a schematic for demonstrating response to an upstream arc fault event.

Referring to FIG. 9, a portion of an AFCI circuit composed of a dv/dt and a di/dt sensor is shown to demonstrate how the sensors respond to the case of an upstream arc fault. A dv/dt sensor 33 is composed of a capacitor 32 in series with a resistor 34 forming a high pass filter connected across the line. A current sensor 36 responds to di/dt of the load current, such that positive di/dt and current produces positive voltage pulses across sensor 36 and a loading resistor 38. The dv/dt steps associated with an upstream arc fault can be simulated by a voltage step generator 40, which is preferably a conventional fully on light dimmer which, for the upstream case, is connected upstream of dv/dt sensor 33 and also upstream of di/dt current sensor 36. Placing the dimmer upstream of dv/dt sensor 33 and di/dt sensor 36, and in series with the upstream line, causes the dimmer to interrupt the voltage as applied to dv/dt sensor 33 and di/dt sensor 36, which sensors 33, 36 are preferably located inside the AFCI device. This causes the voltage step to be in phase with the current step, since the voltage drives the current step, and simulates what would occur when an upstream line voltage transient event causes a load transient event into the load as a voltage.

Figure 10:
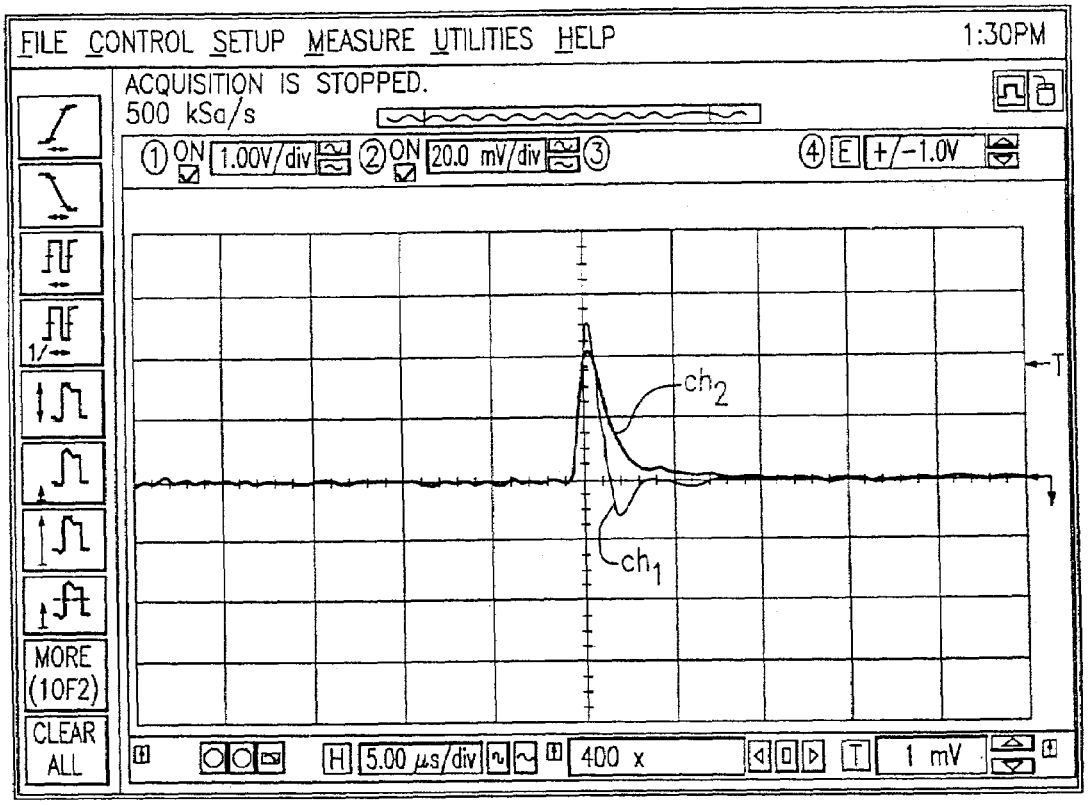
FIG. 10 shows an oscilloscope waveform associated with FIG. 9.

Referring to FIG. 10, the waveforms associated with FIG. 9 when voltage step generator 40 is located upstream are shown. The waveform designated Ch 1 is an oscilloscope waveform of a typical di/dt event caused by the upstream dv/dt event designated Ch 2. For a positive dv/dt transition in the line produced by voltage step generator 40, a positive di/dt and a positive pulse across resistor 34 is produced, represented in the waveform designated Ch 2. Note how the waveforms in FIG. 10 are of the same polarity.

Figure 11:
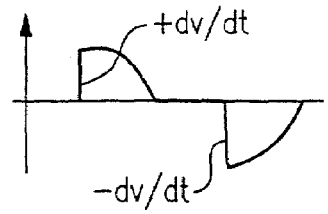
FIG. 11 shows an oscilloscope waveform associated with FIG. 9.

Referring to FIG. 11, the phase-controlled line voltage waveform downstream of voltage step generator 40 is shown, at the input to dv/dt sensor 33 and di/dt sensor 36.

Figure 12:
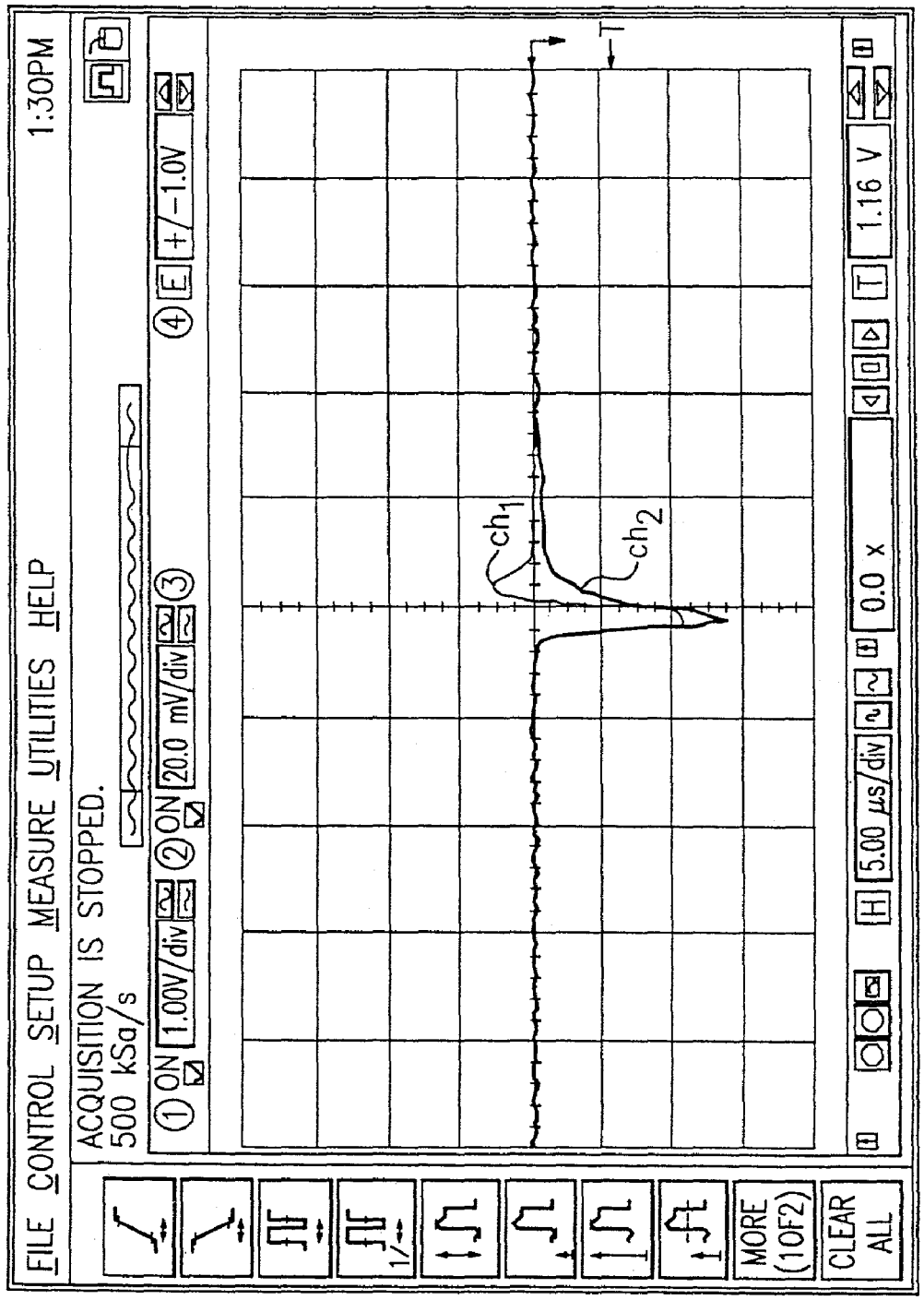
FIG. 12 shows an oscilloscope waveform associated with FIG. 9.

Referring to FIG. 12, additional waveforms for the upstream arc fault case are shown that indicate the same in-phase relationship between Ch 1 and Ch 2 for negative dv/dt pulses produced during the negative half cycle of the power line frequency in FIG. 11 by voltage step generator 40, but which relationship would occur any time during the voltage cycle when an upstream negative dv/dt causes a negative di/dt.

Figure 13:
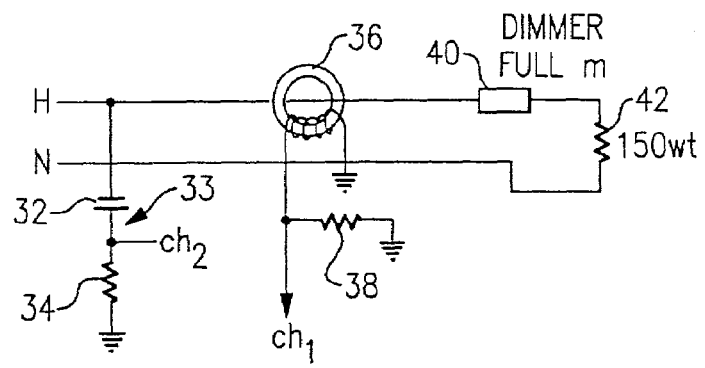
FIG. 13 shows a portion of a schematic for demonstrating response to a downstream arc fault event.

FIG. 13 is similar to FIG. 9, with like components bearing like designations but showing the case when the arc fault is located downstream, simulated by relocating step generator 40 downstream and in particular in series with load 42, producing di/dt in the load current. By relocating the dimmer step generator 40 downstream, step generator 40 acts as a current switch to the load, and the upstream line voltage at the inputs to di/dt sensor 36 and dv/dt sensor is a normal uninterrupted sine wave but with small dv/dt steps caused by conduction of the current steps, which are caused by step generator 40, to the load. This simulates the effect of a downstream arc fault.

Figure 14:
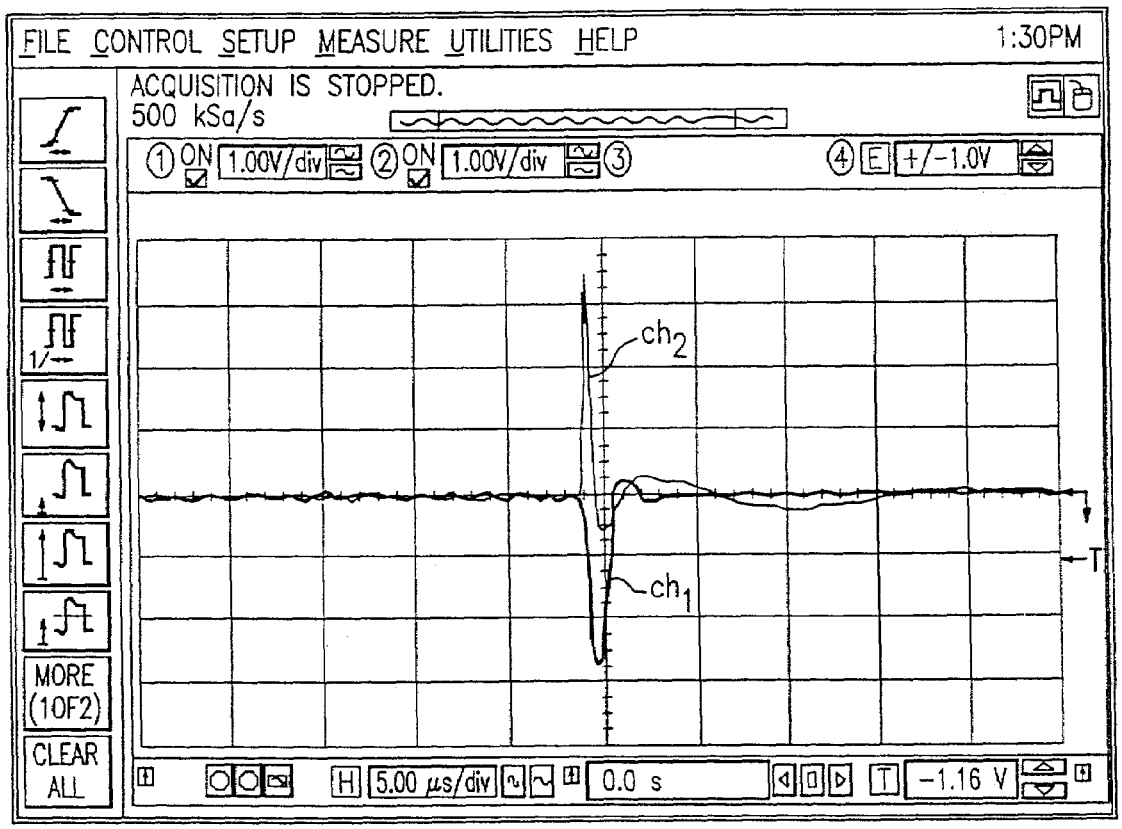
FIG. 14 shows an oscilloscope waveform associated with the schematic of FIG. 13.

Referring to FIG. 14, the waveforms associated with the circuit in FIG. 13 are shown. Conduction of step generator 40, during the negative half cycle, produces a negative di/dt current step across resistor 34 designated as Ch 1. Due to inherent impedance in the line, the abrupt increase in current during the negative half cycle, i.e., the negative di/dt, causes an abrupt decrease in line voltage, or a positive dv/dt during the negative half cycle, as taken from dv/dt sensor 33, as seen in waveform Ch 2. Note how both waveforms of FIG. 13 are of opposite polarity. Thus upstream and downstream arcing events can be determined from the phased relationship between concurrent di/dt and dv/dt signals.

Figure 15:
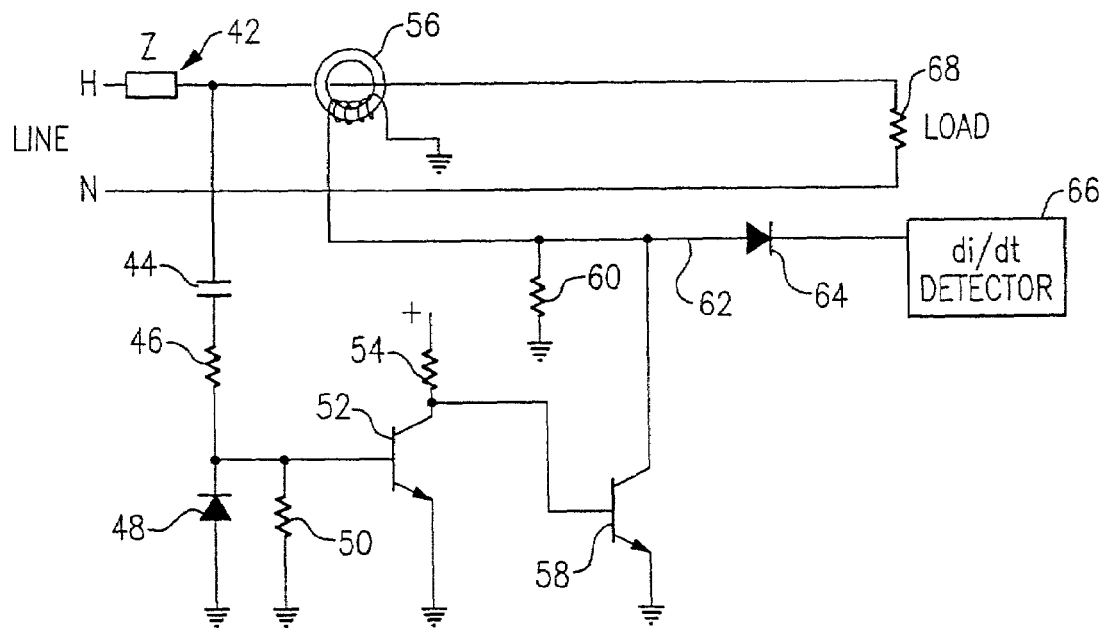
FIG. 15 shows a schematic of a third embodiment of the invention.

Referring to FIG. 15, a fourth circuit implementing the previously described concepts is shown. A transistor 58 is normally held in the ON state by the base current derived through a resistor 54 connected to a positive power supply. Conduction of transistor 58 acts to short out the signal from a di/dt sensor 56. An NPN transistor 52 responds to the positive induced dv/dt driven base current through a capacitor 44 and a resistor 46, which respectively perform the functions previously described for capacitor 32 and resistor 34 in FIG. 9. A diode 48 protects the emitter base junction of transistor 52 from excessive reverse voltage. A resistor 50 acts as a voltage divider against capacitor 44 and resistor 46, which acts to keep the 60 Hz voltage component from biasing transistor 52 into conduction. The current derived from the positive induced dv/dt acts to turn transistor 52 ON, removing the base drive to NPN transistor 58 which is derived from resistor 54 connected to the positive voltage supply. When a positive dv/dt caused by an upstream line transition causes positive current to flow into the base of transistor 52 as described above, thereby causing transistor 52 to conduct and removing base drive from transistor 58, the short is removed from di/dt sensor 56. The di/dt sensor 56 is configured to produce a minus voltage pulse for positive di/dt; therefore, when positive dv/dt removes the shorting effect of transistor 58, the minus voltage pulse arriving from di/dt detector 56 is blocked by a diode 64 from reaching di/dt detector 66, and in this way, di/dt produced by positive upstream dv/dt is blocked from reaching di/dt detector 66. For the upstream minus dv/dt case, the emitter base junction of transistor 52 is reverse biased and does not respond. For simplicity, the circuit of FIG. 15 is configured to detect only positive dv/dt to perform the upstream versus downstream differentiation. Upstream arcing events are ignored thereby.

For the downstream case, the circuit of FIG. 15 responds to the positive dv/dt of the line voltage shown at position 710 in FIG. 3 which disables shorting transistor 58 as described for the upstream case. But as described previously, positive dv/dt occurs at the same time as minus di/dt in the load current which produces a positive voltage output pulse from di/dt sensor 56, which pulse passes through blocking diode 62 whereby the voltage pulse is detected by di/dt detector 66. In this way, the circuit of FIG. 15 responds to downstream transients but not to upstream transients associated with arcing events.

FIG. 15 also shows an impedance 42, which can be either an inherent impedance of the power line or an introduced impedance, and which causes a line voltage step to a lower voltage in response to a load current step. Therefore, a step of one polarity in the load current causes an opposite polarity step in the line voltage, downstream of the line impedance, as a result of the voltage drop across the impedance. The introduced impedance can either be an integral part of the AFCI or located in a separate housing upstream of the AFCI.

Figure 16:
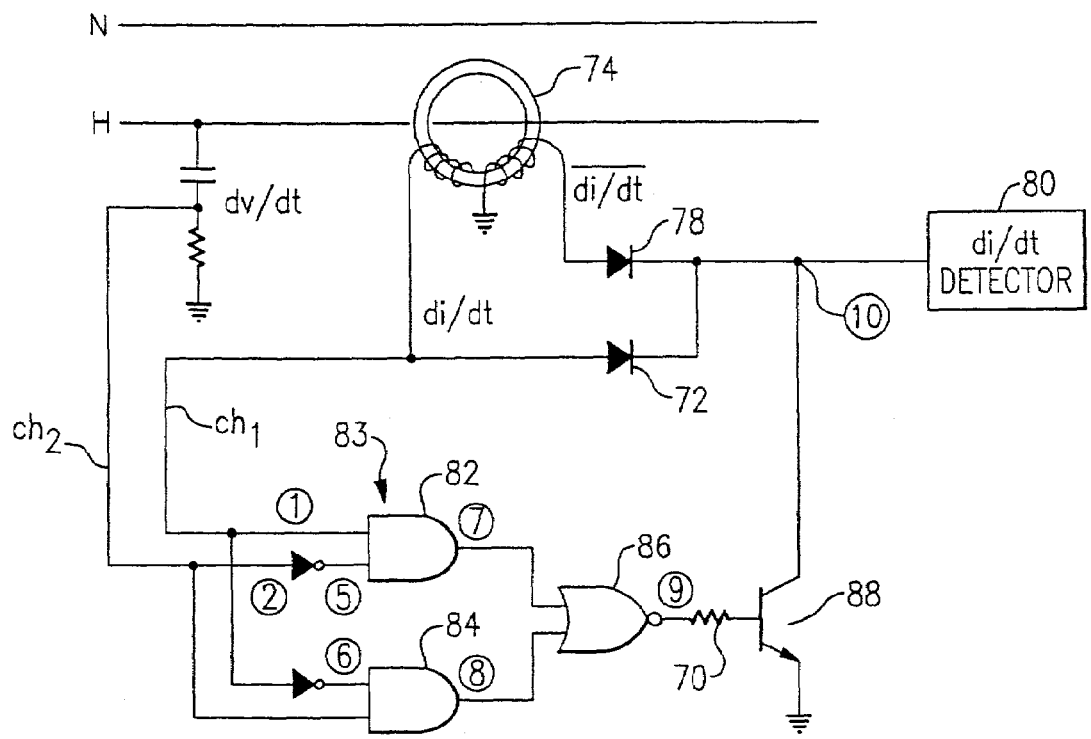
FIG. 16 shows a schematic of a fourth embodiment of the invention.

Referring to FIG. 16, a fifth circuit that responds to both polarities of the line frequency is shown, unlike FIG. 15, which only responds to transient events occurring in the negative half cycle of the power line frequency. The signals shown in FIGS. 10, 12, and 14 and their respective Ch 1 and Ch 2 waveforms serve as inputs to a bipolar logic circuit 83.

If Ch 1 and Ch 2 waveforms are both of the same polarity, then an AND gate 82 receiving signal from Ch 1 and inverted signal from Ch 2, as well as an AND gate 84 receiving inverted signal from Ch 1 and signal from Ch 2, produce low level logic outputs. Consequently a NOR gate 86 maintains a high level logic output keeping di/dt shorting transistor 88 turned on.

Transistor 88 provides the same shorting function previously described for transistor 58 in FIG. 15 for di/dt sensor 56. Di/dt sensor 74 comprises a center tapped winding such that a di/dt signal having positive voltage is produced by one or the other winding segment and transmitted through either rectifier 78 or 72, whichever rectifier is forward biased. The signal through forward biased rectifier 78 or 72 is shorted by transistor 88 when the Ch 1 and Ch 2 signals are in phase. When the Ch 1 and Ch 2 signals are out of phase, either AND gate 82 or AND gate 84 produce a high level logic output, resulting in NOR gate 86 producing a low level logic output and transistor 88 turning off, permitting di/dt signal derived from center tapped sensor 74 through rectifiers 78 or 72 to appear at an input to di/dt detector 80. As a result, di/dt detector 80 is responsive to downstream arcing transient events, but not responsive to upstream arcing events, in deference to the conductive state of transistor 88. Since the circuit in FIG. 16 is responsive to either polarity of dv/dt and di/dt, the circuit is operative during both half cycle polarities of the power line frequency. The function of FIG. 16 could be accomplished alternatively by feeding the Ch 1 and Ch 2 inputs directly to two inputs of a microprocessor whose inputs are responsive to positive and negative voltages.

FIGS. 17A–H show the waveform diagrams associated with enumerated circuit positions shown in FIG. 16. The Ch 1 input to logic circuit 83 is shown in FIG. 17A. The Ch 2 input is shown in FIG. 17B. The inverted input of Ch 2 to AND gate 82 is shown in FIG. 17C. The inverted input of Ch 1 to AND gate 84 is shown in FIG. 17D. The output of AND gate 82 is shown in FIG. 17E, while the output of AND gate 84 is shown in FIG. 17F. The output of NOR gate 86 is shown in FIG. 17G. The input to di/dt detector 80 is shown in FIG. 17H.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. An arc fault detector for a power line system, comprising an upstream/downstream discriminator circuit, wherein said discriminator circuit detects current fluctuations in at least one current characteristic of a load current and voltage fluctuations in at least one voltage characteristic of a line voltage, said discriminator circuit detecting an upstream transient event when said current fluctuations and said voltage fluctuations are in phase and said discriminator circuit detecting a downstream transient event when said current fluctuations and said voltage fluctuations are out of phase.

2. An arc fault detector as in claim 1, wherein said transient events produce a high frequency spectrum.

3. An arc fault detector as in claim 1, wherein said transient events produce a low frequency spectrum.

4. An arc fault detector as in claim 1, wherein said current fluctuations are detected with a current transformer.

5. An arc fault detector as in claim 1, wherein said current fluctuations are detected across an impedance connected in series with said power line.

6. An arc fault detector as in claim 1, wherein said voltage fluctuations are detected with a high pass filter connected across said power line.

7. An arc fault detector as in claim 1, wherein said current fluctuations produced by voltage fluctuations are connected to at least one input of a microprocessor.

8. An arc fault detector as in claim 1, wherein said out of phase voltage fluctuations and current fluctuations are produced by a line voltage drop across an upstream line impedance.

9. An arc fault detector as in claim 8, wherein said line impedance is the inherent line impedance of said power line.

10. An arc fault detector as in claim 8, wherein said line impedance is an impedance introduced within said power line.

11. The arc fault detector of claim 1, wherein said upstream/downstream discriminator circuit is configured to detect arc faults when said detector is coupled to a inductive load such that during intervals when a line voltage and a line current are of a same polarity, said discriminator circuit detects when steps in load current and steps in line voltage are in phase for upstream caused transient events, and out of phase for downstream caused transient events, and wherein during intervals when said line voltage and said line current are of opposite polarity, said discriminator circuit detects when steps in load current and steps in line voltage are out of phase for upstream caused transient events, and in phase for downstream caused transient events.

12. An arc fault detector as in claim 11, wherein said transient events produce a high frequency spectrum.

13. An arc fault detector as in claim 11, wherein said transient events produce a low frequency spectrum.

14. An arc fault detector as in claim 11 wherein said steps in load current are detected with a current transformer.

15. An arc fault detector as in claim 11 wherein said steps in load current are detected across an impedance connected in series with said power line.

16. An arc fault detector as in claim 11, wherein said steps in line voltage are detected with a high pass filter connected across said power line.

17. An arc fault detector as in claim 11, wherein said steps in load current produced by steps in line voltage are connected to at least one input of a microprocessor.

18. An arc fault detector as in claim 11, wherein said out of phase steps in line voltage and load current are produced by a line voltage drop across an upstream line impedance.

19. An arc fault detector as in claim 18, wherein said line impedance is the inherent line impedance of said power line.

20. An arc fault detector as in claim 18, wherein said line impedance is an impedance introduced within said power line.

21. An arc fault protection device, protective of a branch circuit portion of a power line electrical distribution system and connected to a load, comprising:
a first sensor for detecting current fluctuations in at least one current characteristic of load current;
a second sensor for detecting voltage fluctuations in at least one voltage characteristic of a line voltage; and
a discriminator for comparing the polarities of said voltage fluctuations and said current fluctuations, wherein said comparison indicates whether an arc fault or arc mimicking noise is located in said branch circuit portion or located in a remainder of said electrical distribution system based on the comparison of the polarities.

22. The device according to claim 21, further comprising an interrupting mechanism responsive to a signal from said discriminator, wherein said interrupting mechanism does not disconnect said load from said electrical distribution system when said arc fault is located in said remainder of said electrical distribution system.

23. The device according to claim 21, wherein said first and second sensors detect fluctuations in load current or line voltage, respectively, as step changes, wherein those arc faults occurring in said protected branch circuit portion produce contrary step directions with respect to those arc faults occurring in said remainder of said electrical distribution system.

24. The device according to claim 23, wherein said first sensor is a di/dt sensor and said second sensor is a dv/dt sensor.

25. The device according to claim 24, wherein said di/dt sensor converts said current steps into di/dt pulses and said dv/dt sensor converts said voltage steps into dv/dt pulses, wherein a direction of said steps is identifiable from polarities of leading edges of said pulses.

26. The device according to claim 25, wherein an arrival of one of a di/dt pulse and a dv/dt pulse initiates a predetermined polling interval, within which interval an occurrence of an other of said di/dt pulse and said dv/dt pulse is used by said discriminator to establish a location of said arc fault within said electrical distribution system.

27. The device according to claim 26, wherein said predetermined polling interval is followed by a predetermined quiet period during which an absence of di/dt or dv/dt pulses is a prerequisite for initiating a next polling interval.

28. The device according to claim 25, further comprising a clamp for mitigating an erroneous signal following said leading edges of said di/dt or dv/dt pulses.

29. The device according to claim 28, wherein said erroneous signal is an oscillatory ringing from one of said first and second sensors.

30. The device according to claim 25, further comprising a gate, wherein an absence of said dv/dt pulses prevents said gate from delivering said di/dt pulses to said discriminator.

31. The device according to claim 25, wherein said di/dt or dv/dt pulses are exclusively arc cessation pulses.

32. The device according to claim 31, further comprising at least one of a zero cross current detector and zero cross voltage detector for characterizing one of line current and line voltage respectively, wherein said discriminator determines a plurality of phase angles of said di/dt or dv/dt pulses with respect to a zero crossing signal, and wherein arc cessation pulses are those pulses that occur within a predetermined range of said plurality of phase angles.

33. The device according to claim 32, wherein arc cessation pulses are those pulses that occur during each half cycle subsequent to a peak current or voltage.

34. The device according to claim 21, wherein said discriminator is a microprocessor.

35. The device according to claim 34, further comprising first and second hold circuits, wherein said current fluctuation signal and voltage fluctuation signal are held for predetermined times in said first and second hold circuits, respectively, to allot said microprocessor sufficient time to recognize said fluctuations.

36. The device according to claim 21, wherein said load is an inductive load, and said device further comprises:
a line voltage zero cross detector; and
a load current zero cross detector;

wherein said zero cross detectors determine a phased relationship between line voltage and load current, and wherein said discriminator uses voltage fluctuations current fluctuations, and said phased relationship to determine whether an arc fault or arc mimicking noise is located in said branch circuit portion or located in said remainder of said electrical distribution system.

37. The device according to claim 36, further comprising an interrupting mechanism responsive to a signal from said discriminator, wherein said interrupting mechanism does not disconnect said load from said electrical distribution system when said arc fault is located in said remainder of said electrical distribution system.

38. The device according to claim 21, further comprising at least one of a line voltage analog to digital converter connected to said line voltage sensor and a load current analog to digital converter (ADC) connected to said load current sensor;
   wherein said discriminator receives signal from at least one of said analog to digital converters;
   wherein said fluctuations in said load current or said line voltage, respectively, are determined using area comparison of half cycles of the power line frequency, and wherein those arc faults occurring in said protected branch circuit portion produce contrary changes in current and voltage areas with respect to those arc faults occurring in said remainder of said electrical distribution system.

39. The device according to claim 38, wherein said load is an inductive load and said device further comprises:
   a voltage zero cross detector; and
   a current zero cross detector;
   wherein said half cycle periods are identified by said zero cross detectors, said voltage and current half cycle periods being in phased relationship dependent on said load.

40. The device according to claim 38, further comprising an interrupting mechanism responsive to a signal from said discriminator, wherein said interrupting mechanism does not disconnect said load from said electrical distribution system when said arc fault is located in said remainder of said electrical distribution system.

41. The device according to claim 21, wherein said fluctuations in load current are sensed across an impedance inserted in series with the line.

42. The device according to claim 41, wherein said impedance is a resistance.

43. The device according to claim 21, where said fluctuations in line voltage are sensed from an output of a high pass filter.

44. The device according to claim 21, further comprising means for introducing impedance in series with said power line, wherein a fluctuation in load current produces an enhanced fluctuation in line voltage.

45. The device according to claim 44, wherein said introduced impedance is located in a separate housing apart from said device.

46. The device according to claim 21, wherein said device is responsive to voltage and current fluctuations occurring during either polarity of the power line frequency.

47. The device according to claim 21, further comprising a gate, wherein absence of a voltage fluctuation signal opens said gate to prevent delivery of a current fluctuation signal to said discriminator.

48. The device according to claim 21, wherein said current fluctuations and voltage fluctuations are exclusively associated with arc extinguishing.

49. The device according to claim 48, further comprising at least one of a zero cross current detector and a zero cross voltage detector for characterizing line current and line voltage respectively;
   wherein said discriminator determines a plurality of phase angles of voltage fluctuation and current fluctuation events with respect to a zero crossing signal; and
   wherein arc cessation fluctuations are those that occur within a predetermined range of said plurality of phase angles.

50. The device according to claim 49, wherein arc cessation fluctuations are those that occur during each half cycle subsequent to a peak current or voltage.

51. The arc fault protection device of claim 21, further comprising:
   a high frequency detection circuit configured to detect the current fluctuations and the voltage fluctuations, the voltage fluctuations including instantaneous changes on the line voltage, and the current fluctuations including instantaneous changes on the load current; and
   a low frequency detection circuit configured to detect the current fluctuations and the voltage fluctuations, the current fluctuations and the voltage fluctuations including fluctuations in wave amplitudes, wave areas, intervals of the waves, and/or a plurality of harmonics of said fundamental frequency.

52. The device according to claim 51, wherein said plurality of harmonics includes a range from said fundamental frequency through its 10th harmonic.

53. An arc fault protection device, protective of a branch circuit portion of an electrical distribution system and connected to a load, comprising:
   means for detecting current fluctuations in at least one current characteristic of load current;
   means for detecting voltage fluctuations in at least one voltage characteristic of a line voltage; and
   means for comparing the polarities of said voltage fluctuations and said current fluctuations, wherein said comparison indicates whether an arc fault or arc mimicking noise is located in said branch circuit portion or located in a remainder of said electrical distribution system based on the comparison of the polarities.

54. A method for protecting a branch circuit portion of an electrical distribution system from an arc fault, said branch circuit portion being connected to a load, comprising the steps of:
   detecting current fluctuations in at least one current characteristic of load current;
   detecting voltage fluctuations in at least one voltage characteristic of a line voltage; and
   comparing the polarities of said voltage fluctuations and said current fluctuations,
   wherein said comparison indicates whether an arc fault or arc mimicking noise is located in said branch circuit portion or located in a remainder of said electrical distribution system based on the comparison of the polarities.

55. The method of claim 54 further comprising the steps of:
   high frequency filtering a voltage wave and a current wave of said system;
   determining whether a relationship exists between instantaneous changes on said high frequency filtered voltage wave and said high frequency filtered current wave of said system, and if so, whether said relationship indicates whether a transient is upstream or downstream;

low frequency filtering said voltage wave and said current wave of said system; and determining whether fluctuations in wave amplitudes, wave areas, intervals of waves, and/or a change in a plurality of harmonics of said fundamental frequency occur, wherein fluctuations in said low frequency filtered voltage wave in phase with fluctuations in said low frequency filtered current wave indicate that said transient is upstream, and wherein fluctuations in said low frequency filtered voltage wave out of phase with said fluctuations in said low frequency filtered current wave indicates that said transient is downstream.

\* \* \* \* \*